Figure 1:
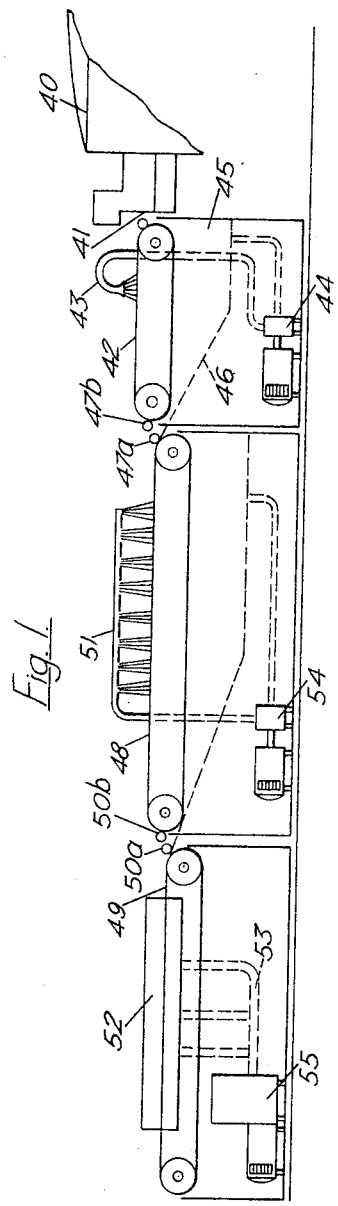

Aug. 30, 1966  P. H. HILGELAND  3,269,297
APPARATUS FOR THE MANUFACTURE OF SAUSAGES
Filed March 5, 1965  3 Sheets-Sheet 1

Inventor
Paul H. Hilgeland
By
Stevens, Davis, Miller & Mosher
Attorneys

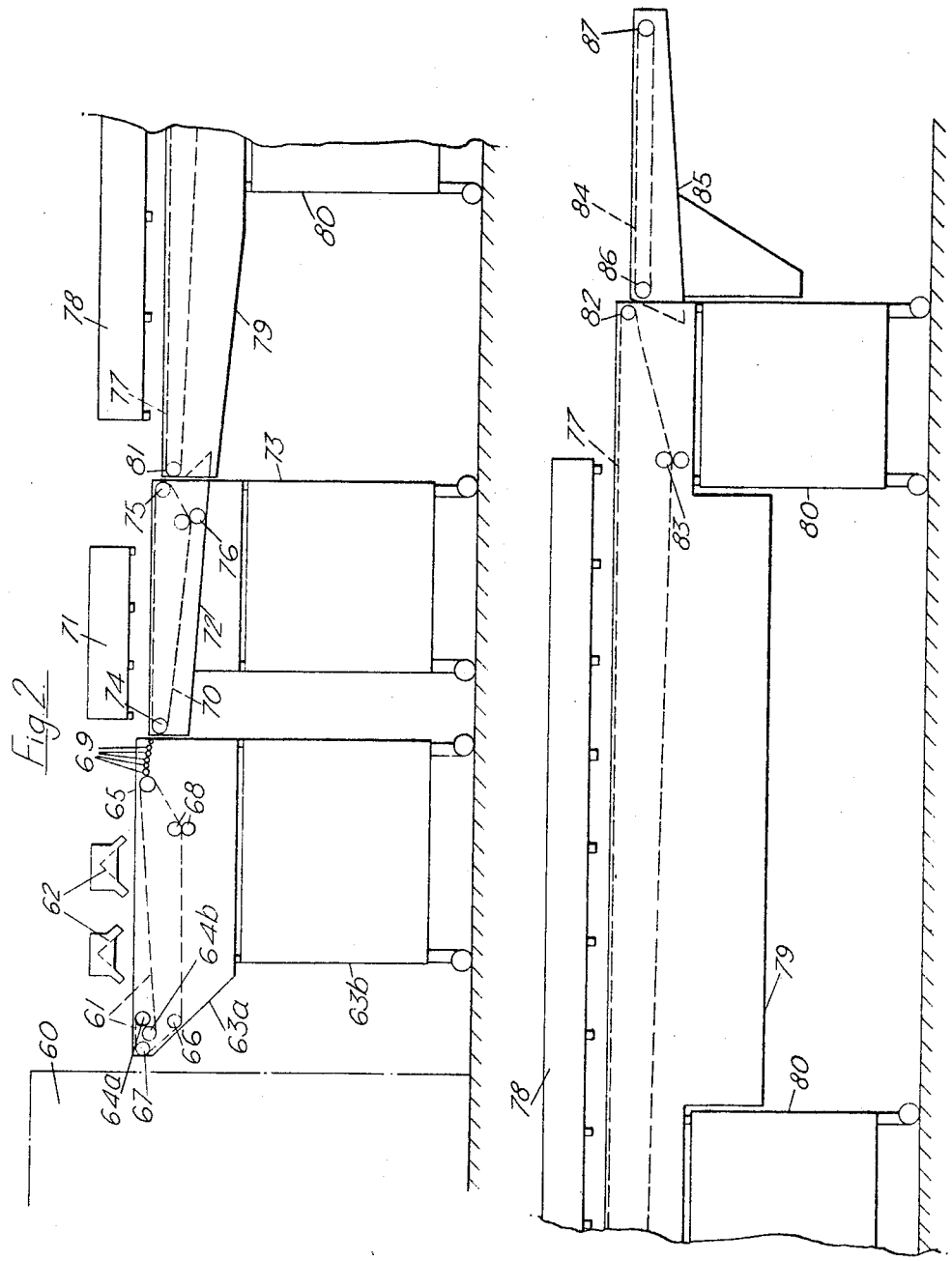

Aug. 30, 1966  P. H. HILGELAND  3,269,297
APPARATUS FOR THE MANUFACTURE OF SAUSAGES
Filed March 5, 1965  3 Sheets-Sheet 3
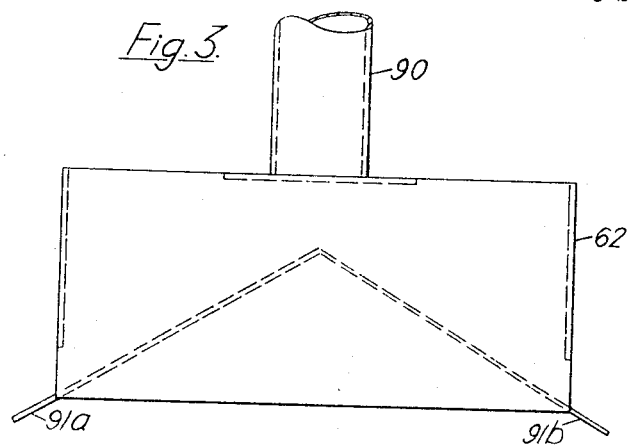
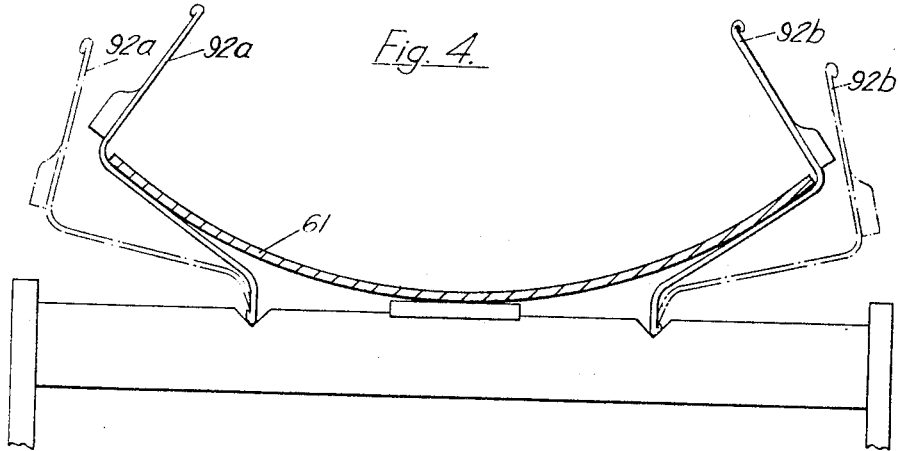
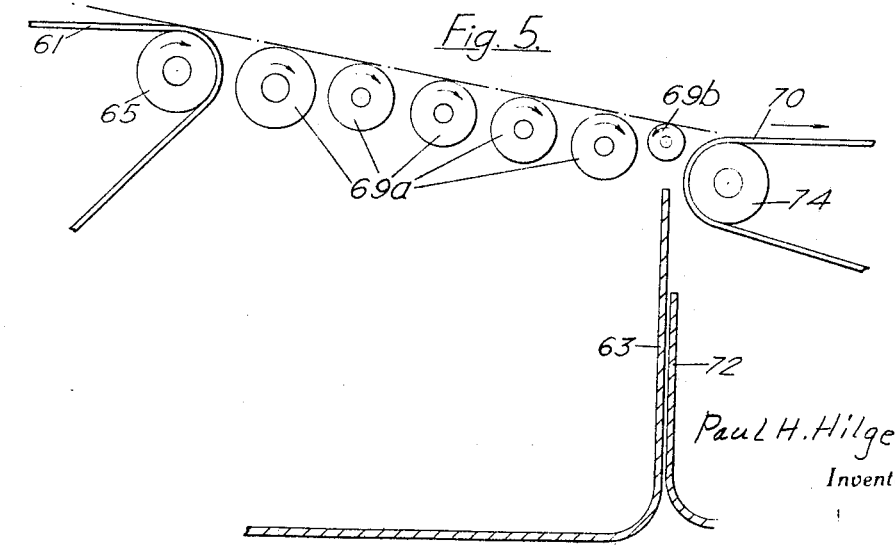
Paul H. Hilgeland
Inventor
By Stevens, Davis, Miller & Mosher
Attorneys

United States Patent Office 3,269,297
Patented August 30, 1966

3,269,297
APPARATUS FOR THE MANUFACTURE OF SAUSAGES
Paul H. Hilgeland, 2 Townsend Ave., London, England
Filed Mar. 5, 1965, Ser. No. 437,408
Claims priority, application Great Britain, July 21, 1961, 26,622/61
11 Claims. (Cl. 99—234)

This invention relates to apparatus for providing shaped articles of ground meat and other foodstuffs, more particularly sausages with edible artificial skins, and is a continuation-in-part of my application Serial No. 210,695, filed July 18, 1962, now abandoned.

The apparatus of the invention is especially advantageously used for the automatic production at relatively high speed of sausages having artificial skins. In recent years skinless sausages have become increasingly popular. They possess the advantages over sausages with skins of being free from a relatively tough outer covering, and of being free from a tendency to burst while being cooked. Moreover it is very difficult effectively to sterilize the traditional type of sausage skin (i.e. that derived from cattle, sheep, or pigs' intestine) and the presence of bacteria in the skins considerably shortens the shelf-life of the sausages made from them. In addition skinless sausages are free from the undesirable flavour normally associated with the traditional type of sausage skin. However, skinless sausages have the disadvantage that they are partially cooked during production, so that they cannot subsequently be considered quite fresh. In addition the use of a skin which is subsequently removed, as in some methods of making skinless sausages, leads to higher costs and relatively slow rates of production. Moreover, the absence of a skin causes the sausage to lose more fat and meat juice during cooking than does a sausage having a skin.

Sausages and other shaped foodstuffs produced using the new apparatus are substantially free from these disadvantages, and have their whole surface including their ends sealed with a thin adherent skin of calcium alginate, a result which cannot be obtained in conventional processes of manufacture of sausages with or without skins.

The apparatus of the present invention comprises:
A ground meat extruder;
A cut-off device adapted to cut meat leaving said extruder into shaped portions;
A first endless conveyor belt, adapted to receive portions from the said cut-off device, a first liquid applicator, adapted to apply sodium alginate solution to the shaped portions on the said first conveyor belt, and means maintaining the upper half of the said belt in an upward U-shape while the meat portions are thereon;
A first drainage tank, adapted to receive sodium alginate or other edible coagulable solution draining from the first conveyor belt and to act as a reservoir for the aforesaid liquid applicator;
A second endless conveyor belt below the first conveyor belt, a plurality of driven rollers, adapted to convey coated portions leaving the said first belt to the said second belt and spaced to allow excess sodium coating to drain therefrom, a second liquid applicator adapted to apply calcium chloride solution to the sausage portions on the said second belt, and means for maintaining the upper half of the said second belt in an upward U-shape while the sausage portions are thereon;
A second drainage tank, adapted to receive calcium chloride solution draining from the second conveyor belt and to act as a reservoir for the aforesaid second liquid applicator;
A third endless and perforated conveyor belt, not above the second conveyor belt, positioned to receive coated sausage portions leaving the said second belt, and a blower adapted to direct a blast of air to dry the sausage portions on the third belt; and
Driving means for driving the aforesaid belts and the driven rollers in the same direction.

Conveyor belt systems have, of course, previously been proposed for a variety of purposes involving the transport of solids, but in such prior systems the problem has generally been to ensure that the conveyor can carry without breakdown or costly maintenance as large loads as possible. In contrast, in the apparatus of this invention, the weight and size of the sausage portions presents no especial problem, but it has been found necessary to include the various features defined herein to ensure that the portions are adequately covered with the appropriate liquid on each belt and that no undesired and wasteful mixing of liquids occurs. This is a problem which, so far as is known, has not previously been experienced, still less solved, in connection with conveyor belt systems.

The extruder is of the known kind in which the foodstuff is extruded in a continuous cylinder using a portioning device which causes a pause after the extrusion of a portion. The cut-off device should, of course, be synchronized to exert its cutting action during this pause. Since meat extruders of the aforesaid kind are widely used in the production of sausages and other foodstuffs by conventional methods, it is within the purview of the invention to produce the new apparatus without the meat extruder so that the user can fit his own extruder to it.

The cut-off device is best constructed in the way described and claimed in my copending application Serial No. 210,694, filed on July 18, 1962, now Patent No. 3,158,895, to which reference is made for a detailed description of the preferred form of cut-off device for cutting and shaping extruded meat products.

The three conveyor belts may be made of any suitable flexible, inert, non-toxic sheet material. The first two belts are impervious to liquid so that the sausage portions may be partially immersed in the sodium alginate or calcium chloride solution, as the case may be. Consequently plastic materials such as polyvinyl chloride or nylon are suitable. The third belt, on the other hand, is perforated, and is conveniently made of stainless steel gauze. Since users of the new apparatus may not wish to dry the sausage portions with freshly coagulated skins directly, it is within the scope of the invention to omit the third belt altogether.

In order to provide an adequate depth of coagulable liquid or coagulant solution through which the sausage portions can pass, so as to ensure that the undersides of the portions as well as the upper are thoroughly covered the sides of the first and second belts are held by guides in an upward U-shape (i.e. upwardly concave), preferably by adjustable guides which may be varied so as to adjust the degree of concavity of the belts to suit the calibre of the sausages being coated thereon. The thicker the sausage, the more concave should the belt be.

It is sometimes a problem to ensure that the sausage portions leaving the cut-off device are satisfactorily spaced on the first belt, because in certain circumstances they are liable to bunch together. This may be prevented by passing the belt horizontally away from the cut-off device round two idler rollers, so that the belt passes first down and back round the first roller and then forward and upward round the second roller. This arrangement leaves a small gap in the first belt over which the sausage portions can pass, and towards which the end of the belt away from the cut-off device slopes.

In order to save space, it is generally preferred to construct the second belt (on which the sausage portions are sprayed with calcium chloride or other appropriate coagulant solution) in two sections, of which the second section is positioned to receive sausage portions leaving the first belt and moves substantially less fast than, e.g. at about half the speed of, the first. It is then found that the sausage portions, which move lengthways on the first belt and the first section of the second belt, assume a staggered configuration on the second section of the second belt and thus take up less room. It is not feasible, however, to run the whole of the second belt at a speed slower than the first belt, as this causes imperfections to develop in the alginate coating. It is only after the sodium alginate has been at least partially converted into calcium alginate that this expedient can be adopted.

The liquid applicators, through which the sodium alginate and calcium chloride solutions are applied, are preferably diffusers which produce a thin curtain of the solution in question through which the sausage portions pass. Excess solution drains from the belts into reservoir tanks from which it is recirculated by pumps to the diffusers.

Between the first and second belts the sausage portions are conveyed by a group of driven rollers spaced so as to allow excess sodium alginate solution to drain from the sausage portions. It is especially preferred to provide an additional roller adjacent the second belt and to drive this additional roller in a direction opposite to the other group of rollers and to the belts themselves and to make this additional roller smaller than the others. If this is done, "tails" of sodium alginate solution at the ends of the sausages are removed and products of better appearance are obtained.

Where the sausage portions having calcium alginate skins are dried on the third belt, this may be hastened by heating the blast of air directed over the portions.

The apparatus of the invention is illustrated in the accompanying drawings, in which FIGURE 1 represents a diagrammatic side view of the apparatus of the invention; FIGURE 2 represents a side view of a preferred embodiment of the invention; FIGURE 3 represents a side view of a liquid diffuser as used in the apparatus of FIGURE 2; FIGURE 4 shows a cross-section of the guides used in the apparatus of FIGURE 2 to bring the first and second belts into an upward U-shape; and FIGURE 5 shows the arrangement of driven rollers used between the first and second belts of the apparatus of FIGURE 2.

In FIGURE 1, the apparatus comprises a cut-off device 41 attached to a conventional portioner filler 40 of known kind which with the cut-off device extrudes sausage meat in shaped sausage portions. A continuous belt conveyor 42 collects the sausage portions which are sprayed via spray nozzle 43 while on the conveyor with a solution of sodium alginate. The edges of the belt beneath the spray nozzle are bent upwards by guides (not shown) so that the belt is U-shaped. Such an arrangement is essential to insure the adequate coating of the underside of the sausage portions with the sprayed solution. Excess of the said solution runs back into a tank 45 via a draining tray 46. The spray nozzle 43 is fed from the tank 45 by the pump 44. On leaving the conveyor 42, the coated sausage portions run along the driven rollers 47a and 47b onto the conveyor 48 which runs beneath a series of sprays 51 for the calcium chloride solution supplied by pump 54. The sausages with calcium alginate coatings pass from conveyor 48 to conveyor 49 via driven rollers 50a, 50b and are carried thereby through a tunnel 52 in which the sausages are dried by draughts of hot and then cold air supplied from pump 55 through pipes 53.

FIGURES 2, 3, 4 and 5 show a preferred apparatus in accordance with the invention. In FIGURE 2, a conventional sausage meat extruder incorporating a portioning device and a cut-off device of the kind described in detail in my aforesaid Patent No. 3,158,895 (indicated generally as 60) feed sausage meat portions onto belt 61, driven by the pair of pinch rollers 68 over idler rollers 64a, 64b, 65, 66, and 67. The belt 61 which is preferably made of nylon sheet is substantially horizontal between rollers 67 and 64a and rises gently between rollers 64b and 65. Diffusers 62 supplied by a pump (not shown) from reservoir 63a, supported on console 63b, are placed over belt 61, so that sodium alginate solution in four thin "curtains" can be applied to the sausage portions on the belt. The edges of the belt are forced upwards by guides (not shown) so that the belt assumes a U-shaped cross-section, thus forming an open-ended trough for the sodium alginate solution and in which the sausage portions move. Excess sodium alginate solution drains off the belt 61 into the reservoir 63a.

The sausage portions covered with sodium alginate solution leave the belt 61 and pass over the system of rollers indicated generally as 69 to the first section 70 of the second belt. This section is driven via pinch rollers 76 over idler rollers 74 and 75 at the same speed as the first belt 61. Calcium chloride solution is fed via diffusers 71 over the sausage portions on the first section 70 of the second belt and preliminary reaction occurs with formation of a calcium alginate skin on the sausage portions. Excess calcium chloride solution drains from the first section 70 via draining board 72 supported on console 73 into reservoir 79, from which the diffusers 71 are fed by a pump (not shown).

On leaving the first section 70, the sausage portions are fed onto the second section 77 of the second belt, driven by pinch rollers 83 over idler rollers 81 and 82 at half the speed of the first section 70. While on the second section, the sausage portions are covered with calcium chloride solution via diffusers 78 fed from reservoir 79 by a pump (not shown). This reservoir 79 is supported on consoles 80.

Both the first section 70 and the second section 77 of the second belt are passed through guides to force the upper surface of the belt into a U-shaped cross-section, thus forming an open-ended trough in which the sausage portions move, and both sections may be, and preferably are, made of the same material as the first belt.

The sausage portions with calcium alginate skins leave the second section 77 of the second belt and are fed to the third belt 84, which is of stainless steel gauze, and is driven by rollers 86 and 87 provided with sprockets (not shown). Any calcium chloride solution still adhering to the sausage portions drains back via draining board 85 into reservoir 79.

A blower (not shown) may be provided to direct a blast of air, hot or cold (preferably first hot and then cold) over the sausage portions on the third belt 84 to dry them. On leaving this belt, the sausages are collected and packed in the conventional way.

As already stated, it is possible, if desired, to dispense with the third belt altogether, and for this reason the apparatus of FIGURE 2 is preferably made so that the third belt 84 together with the associated draining board 85 and rollers 86 and 87 can be readily detached from the remainder.

The sources of power for driving the belts are conveniently placed inside the consoles 63b, 73, and 80, as are the pumps for supplying the respective liquids to the diffusers 62, 71, and 78. Obviously, if desired, a single source of power may be used for driving all the belts.

In FIGURES 1 and 2, the belts are shown as being in line and this arrangement will generally be preferred. However, in practice it may often be desirable to have the conveyors at right angles to one another, for example, to make the apparatus more compact.

FIGURE 3 shows, in cross-section, a preferred form of diffuser 62 for use in the apparatus of FIGURE 2. The sodium alginate solution is pumped in through pipe 90 and is distributed by plates 91a and 91b in two thin flat streams, or "curtains," through which the sausage portions pass. The diffusers 71 and 78 over the first and second sections of the second belt may be constructed in similar manner.

FIGURE 4 shows a cross-section of the belt 61 of the apparatus of FIGURE 2 passing through guides 92a, 92b which force the edges upwards so that the cross-section assumes a U-shape. As already indicated, the degree of concavity of the U-shape may be varied by varying the positions of the guides, e.g. to the position indicated by dotted lines.

While adjustable guides 92 are shown more-or-less diagrammatically, it is understood that the same may take various conventional forms and that the specific details of each construction being well-known in the art do not, per se, constitute invention. Such details are shown in prior patents such as Hughes, 3,088,580, Harbottle 2,901,092, and 2,901,093, and Steckel 809,227 as well as in Link-Belt Company Catalog 1050, at page 503.

FIGURE 5 shows in detail the arrangement of rollers 69 between the first belt 61 and the first section of the second belt 70 in the apparatus of FIGURE 2. The five rollers designated 69a are driven in the same direction as the belt 61, while the smaller additional roller 69b is driven in the opposite direction. As already explained, this arrangement prevents "tails" of sodium alginate solution being transferred onto the first section 70 of the second belt. It will be noted that the contra-rotating roller 69b is immediately over the inner edge of the sodium alginate solution reservoir 63.

The sodium alginate solution fed over the sausage portions on the first belt is generally of ½ to 5% strength, while the calcium chloride solution fed over the second belt is of at least 5% strength, e.g. 10%.

The times involved in producing sausages with the new apparatus are ordinarily as follows. The sausage portions remain on the first belt for 1–5 seconds, on the first section of the second belt for 1–5 seconds, and on the second section thereof for 25–60 seconds. Thus, the first belt may be three feet long and move at 60 ft. per minute, and the first section of the second belt may be of the same size and move at the same speed. Similarly, the second section of the second belt may be fifteen feet long and move at 30 ft. per minute. The rate of output of sausages is, in practice, governed by the rate of extrusion of the sausage meat by the extruder, and outputs of 180 sausages per minute can be achieved without difficulty.

I claim:

1. Apparatus for the manufacture of foodstuffs having edible artificial skins comprising:
   means to supply shaped foodstuffed portions in a spaced sequence;
   a first endless conveyor belt, adapted to receive shaped foodstuff portions from the said supply means, a first liquid applicator, adapted to apply an edible coagulable solution to the shaped portions on the said first conveyor belt, and means maintaining the upper half of the said belt in an upward U-shape while the shaped portions are thereon;
   a first drainage tank, adapted to receive coagulable solution draining from the first conveyor belt and to act as a reservoir for the aforesaid liquid applicator;
   a second endless conveyor belt spaced from the first conveyor belt, a plurality of driven rollers, adapted to convey coated foodstuff portions leaving the said first belt to the said second belt and spaced to allow excess coagulable solution to drain therefrom, a second liquid applicator adapted to apply a coagulant solution to the coated portions on the said second belt, and means for maintaining the upper half of the said second belt in an upward U-shape while the said portions are thereon;
   a second drainage tank, adapted to receive coagulant solution draining from the second conveyor belt and to act as a reservoir for the aforesaid second liquid applicator;
   a third endless and perforated conveyor belt, not above the second conveyor belt, positioned to receive coagulant coated portions leaving the said second belt, and a blower means adapted to direct a blast of air to dry the said portions on the third belt; and
   driving means for driving the aforesaid belts and the driven rollers in the same direction.

2. Apparatus for the manufacture of meat products having edible artificial skins comprising:
   means to supply a succession of shaped meat products in a spaced sequence;
   a first endless conveyor belt, adapted to receive shaped meat portions from the said supply means, a first liquid applicator, adapted to apply a coagulable solution to the shaped meat portions on the said first conveyor belt, and means maintaining the upper half of the said belt in an upward U-shape while the meat portions are thereon;
   a first drainage tank, adapted to receive coagulable solution draining from the first conveyor belt and to act as a reservoir for the aforesaid liquid applicator;
   a second endless conveyor belt below the first conveyor belt and in two sections, the second section being positioned to receive coated meat portions leaving the first section, a plurality of driven rollers adapted to convey meat portions leaving the said first conveyor belt to the said first section of the said second belt and spaced to allow excess coagulable solution to drain therethrough, a second liquid applicator adapted to apply a liquid coagulant to the coated meat portions on both sections of the said second belt, and means for maintaining the upper halves of both sections of the said second belt in an upward U-shape while the meat portions are thereon;
   a second drainage tank, adapted to receive coagulant liquid draining from the second conveyor belt and to act as a reservoir for the aforesaid second liquid applicator;
   a third endless and perforated conveyor belt, not above the second conveyor belt, positioned to receive coagulant coated meat portions leaving the said second belt, and a blower means adapted to direct a blast of air to dry the said portions on the third belt; and
   driving means for driving the aforesaid belt and the driven rollers in the same direction.

3. Apparatus according to claim 1 in which, in the plurality of driven rollers adapted to convey foodstuff portions leaving the said first belt to the said second belt, an additional roller is provided adjacent the said second belt and is driven in a direction contrary to that of the said belts, the diameter of the said additional roller adjacent the said second belt being less than that of the other rollers.

4. Apparatus according to claim 1 in which the means for maintaining the upper halves of the said first and second belts in an upward U-shape comprises a pair of guides for each belt, said guides being adjustable to vary the degree of concavity of the upward surfaces of the said belts.

5. Apparatus for the application of edible skins to sausages comprising:
   means for supplying shaped sausage portions without skins in a spaced sequence;
   a first endless conveyor belt, adapted to receive shaped sausage portions from the said supply means, a first liquid applicator, adapted to apply a coagulable liquid to the shaped sausage portions on the said first conveyor belt, and means maintaining the upper half of the said belt in an upward U-shape while the sausage portions are thereon;
   a first drainage tank, adapted to receive coagulable liquid draining from the first conveyor belt and to act as a reservoir for the aforesaid liquid applicator;
   a second endless conveyor belt below the first conveyor belt, a plurality of driven rollers, adapted to convey sausage portions leaving the said first belt to the said second belt and spaced to allow excess coagulable liquid to drain therefrom, a second liquid applicator adapted to apply a coagulant liquid to the sausage portions on the said second belt, and means for maintaining the upper half of the said second belt in an upward U-shape while the sausage portions are thereon;

a second drainage tank, adapted to receive coagulant liquid draining from the second conveyor belt and to act as a reservoir for the aforesaid second liquid applicator; and driving means for driving the aforesaid belts and the driven rollers in the same direction.

6. Apparatus for the continuous manufacture of sausages having edible artificial skins comprising:

a sausage meat extruder;

a cut-off device adapted to cut sausage meat leaving said extruder into shaped sausage portions;

a first endless conveyor belt, adapted to receive shaped sausage portions from the said cut-off device, a first liquid applicator, adapted to apply a coagulable solution to the shaped sausage portions on the said first conveyor belt, and means maintaining the upper half of the said belt in an upward U-shape while the sausage portions are thereon;

a first drainage tank, adapted to receive coagulable solution draining from the first conveyor belt and to act as a reservoir for the aforesaid liquid applicator;

a second endless conveyor belt below the first conveyor belt and in two sections, the second section being positioned to receive coated sausage portions leaving the first section, a plurality of driven rollers adapted to convey sausage portions leaving the said first conveyor belt to the said first section of the said second belt and spaced to allow excess coagulable solution to drain therethrough, a second liquid applicator adapted to apply coagulant solution to the sausage portions on both sections of the said second belt, and means for maintaining the upper halves of both sections of the said second belt in an upward U-shape while the sausage portions are thereon;

a second drainage tank, adapted to receive coagulant solution draining from the second conveyor belt and to act as a reservoir for the aforesaid second liquid applicator; and driving means for driving the aforesaid belts and the driven rollers in the same direction.

7. Apparatus according to claim 6 in which two auxiliary rollers are provided over which the first endless conveyor belt passes such that the upper surface of the said belt after leaving the proximity of the cut-off device turns downward and back round the first roller and then forwards and upwards and over the second roller, the upper surface of the said belt being divided thereby into two sections, the first substantially horizontal and the second at a small upward angle to the first.

8. Apparatus for the continuous manufacture of meat products having edible artificial skins comprising:

a meat product extruder;

a cut-off device adapted to cut meat products leaving said extruder into shaped portions;

a first endless conveyor belt, adapted to receive shaped portions from the said cut-off device, two auxiliary rollers over which the said endless belt passes such that the upper surface of the said belt after leaving the proximity of the cut-off device turns downward and back round the first roller and then upward and forwards over the second roller, the upper surface of the said belt being thus divided into two sections, the first substantially horizontal and the second at a small upward angle to the first, a plurality of liquid diffusers adapted to diffuse a coagulable solution over the shaped portions on the said first conveyor belt, and a pair of guides adapted to maintain the upper surface of the said first conveyor belt upwardly concave, the said guides being adjustable to vary the degree of concavity;

a first drainage tank, adapted to receive coagulable solution draining from the first conveyor belt and to act as a reservoir for the aforesaid liquid applicator;

a second endless conveyor belt below the first conveyor belt and in two sections, the second section being positioned to receive coated sausage portions leaving the first section, a plurality of driven rollers adapted to convey coated portions leaving the said first conveyor belt to the first section of the said second conveyor belt and spaced to allow excess coagulable solution to drain therethrough, an additional roller adjacent the first section of the said second belt being driven in a direction contrary to that of the said belt, while the plurality of other rollers are driven in the same direction as the said belt, the diameter of the said additional contra-rotating roller being less than that of the other rollers, a second liquid diffuser adapted to diffuse a coagulant solution over the coated portions on both sections of the said second belt, and two pairs of guides adapted to maintain the upper surfaces of both sections of the said belt upwardly concave, the said guides being adjustable to vary the degree of concavity;

a second drainage tank, adapted to receive coagulant solution draining from the second conveyor belt and to act as a reservoir for the aforesaid second liquid applicator;

a third endless and perforated conveyor belt, not above the second conveyor belt, positioned to receive the resulting skin covered portions leaving the said second belt, and blower means adapted to direct a blast of air to dry the said portions on the third belt; and driving means for driving the aforesaid belts and driven rollers in the same direction, the said additional contra-rotating roller being driven in the opposite direction, the speed of the first belt and of the first section of the second belt being the same, and the speed of the second section of the second belt and of the third belt being the same, the speed of the second section of the second belt being substantially less than the speed of the first section of the second belt.

9. Apparatus for the continuous manufacture of sausages having edible artificial skins comprising:

a sausage meat extruder;

a cut-off device adapted to cut sausage meat leaving said extruder into shaped sausage portions;

a first endless conveyor belt, adapted to receive shaped sausage portions from the said cut-off device, two auxiliary rollers over which the said endless belt passes such that the upper surface of the said belt after leaving the proximity of the cut-off device turns downward and back round the first roller and then upward and forwards over the second roller, the upper surface of the said belt being thus divided into two sections, the first substantially horizontal and the second at a small upward angle to the first, a plurality of liquid diffusers adapted to diffuse a coagulable solution over the sausage portions on the said first conveyor belt, and a pair of guides adapted to maintain the upper surface of the said first conveyor belt upwardly concave, the said guides being adjustable to vary the degree of concavity;

a first drainage tank, adapted to receive coagulable solution draining from the first conveyor belt and to act as a reservoir for the aforesaid liquid applicator;

a second endless conveyor belt below the first conveyor belt and in two sections, the second section being positioned to receive coated sausage portions leaving the first section, a plurality of driven rollers adapted to convey sausage portions leaving the said first conveyor belt to the first section of the said second conveyor belt and spaced to allow excess coagulable solution to drain therethrough, an additional roller adjacent the first section of the said second belt being driven in a direction contrary to that of the said belt, while the plurality of other rollers are driven in the same direction as the said belt, the diameter of the said additional contra-rotating roller being less than that of the other rollers, a second liquid diffuser adapted to diffuse a coagulant solution over the sausage portions on both sections of the said second belt, and two pairs of guides adapted to maintain the upper surfaces of both sections of the said belt upwardly concave, the said guides being adjustable to vary the degree of concavity;

a second drainage tank, adapted to receive a coagulant solution draining from the second conveyor belt and to act as a reservoir for the aforesaid second liquid applicator; and driving means for driving the aforesaid belts and driven rollers in the same direction, the said additional contra-rotating roller being driven in the opposite direction, the speed of the first belt and of the first section of the second belt being the same, and the speed of the second section of the second belt being substantially less than the speed of the first section of the second belt.

10. Apparatus for the continuous manufacture of sausages having edible artificial skins comprising:

a cut-off device adapted to cut sausage meat leaving a sausage meat extruder into shaped sausage portions;

a first endless conveyor belt, adapted to receive shaped sausage portions from the said cut-off device, a first liquid applicator, adapted to apply sodium alginate solution to the shaped sausage portions on the said first conveyor belt, and means maintaining the upper half of the said belt in an upward U-shape while the sausage portions are thereon;

a first drainage tank, adapted to receive a coagulable solution draining from the first conveyor belt and to act as a reservoir for the aforesaid liquid applicator;

a second endless conveyor belt below the first conveyor belt, a plurality of driven rollers, adapted to convey sausage portions leaving the said first belt to the said second belt and spaced to allow excess coagulable solution to drain therefrom, a second liquid applicator adapted to apply coagulant solution to the sausage portions on the said second belt, and means for maintaining the upper half of the said second belt in an upward U-shape while the sausage portions are thereon;

a second drainage tank, adapted to receive coagulant solution draining from the second conveyor belt and to act as a reservoir for the aforesaid second liquid applicator;

a third endless and perforated conveyor belt, not above the second conveyor belt, positioned to receive coated sausage portions leaving the said second belt, and a blower means adapted to direct a blast of air to dry the sausage portions on the third belt; and driving means for driving the aforesaid belts and the driven rollers in the same direction.

11. Apparatus for the continuous manufacture of sausages having edible artificial skins comprising:

a cut-off device adapted to cut sausage meat leaving a sausage meat extruder into shaped sausage portions;

a first endless conveyor belt, adapted to receive shaped sausage portions from the said cut-off device, a first liquid applicator, adapted to apply sodium alginate solution to the shaped sausage portions on the said first conveyor belt, and means maintaining the upper half of the said belt in an upward U-shape while the sausage portions are thereon;

a first drainage tank, adapted to receive a coagulable solution draining from the first conveyor belt and to act as a reservoir for the aforesaid liquid applicator;

a second endless conveyor belt below the first conveyor belt, a plurality of driven rollers, adapted to convey sausage portions leaving the said first belt to the said second belt and spaced to allow excess coagulable solution to drain therefrom, a second liquid applicator adapted to apply coagulant solution to the sausage portions on the said second belt, and means for maintaining the upper half of the said second belt in an upward U-shape while the sausage portions are thereon;

a second drainage tank, adapted to receive coagulant solution draining from the second conveyor belt and to act as a reservoir for the aforesaid second liquid applicator; and driving means for driving the aforesaid belts and the driven rollers in the same direction.

References Cited by the Examiner
UNITED STATES PATENTS

| | | | |
|---|---|---|---|
| 1,309,106 | 7/1919 | Savy | 118—24 X |
| 1,494,904 | 5/1924 | Hague | 99—109 |
| 2,248,291 | 7/1941 | Walborn | 107—54.2 |
| 2,373,849 | 4/1945 | Palmer | 99—169 X |
| 2,573,486 | 10/1951 | Pollitz | 198—204 |
| 2,663,281 | 12/1953 | Wright et al. | 99—109 X |
| 3,041,182 | 6/1962 | Hansen et al. | 99—169 |
| 3,088,580 | 5/1963 | Hughes | 198—192 X |

FOREIGN PATENTS

| | | |
|---|---|---|
| 672,035 | 5/1952 | Great Britain. |
| 712,443 | 7/1954 | Great Britain. |

WALTER A. SCHEEL, *Primary Examiner.*

IRVING BUNEVICH, *Examiner.*

CLYDE I. COUGHENOUR, *Assistant Examiner.*